April 29, 1930.    H. W. TURNER    1,756,892
ELECTRICAL WINDING
Filed May 22, 1928

Inventor:
Harry W. Turner,
by Charles E. Tullar
His Attorney

UNITED STATES PATENT OFFICE

HARRY W. TURNER, OF SCHENECTADY, NEW YORK, ASSIGNOR TO GENERAL ELECTRIC COMPANY, A CORPORATION OF NEW YORK

ELECTRICAL WINDING

Application filed May 22, 1928. Serial No. 279,695.

My invention relates to electrical windings, and has for its object the provision of a simple, rugged and efficient method and means for insulating and securing electrical windings.

My invention is particularly applicable to electric motors such as employed in railway, truck and mill service where the motor windings are subjected to the actions of moisture, acids, dirt and oil, and to exceptional vibration and high operating temperatures.

The general arrangement for securing the motor windings has been to bind them with wire bands. This method has proven to be more or less unsatisfactory not only because it affords no protection for the winding insulation against the actions of moisture, acids, dirt, oil, etc., but the bands fail to securely hold the various windings in place, particularly those fitted upon the rotating members of the motor where great vibrational and centrifugal strains occur. My invention, therefore, contemplates the provision of means for securing electrical windings whereby the above mentioned disadvantages in the ordinary arrangements, are overcome.

In carrying my invention into effect in one form thereof, I imbed the windings to be insulated and secured in a plastic mineral compound applied during the assembly of the windings. After the windings have been positioned and thoroughly packed with the plastic compound, the whole is heated and finally cooled whereby the compound hardens to securely hold the windings in place. Preferably I employ a suitable insulating asphaltum compound mixed with proper proportions of soapstone.

Figure 1:
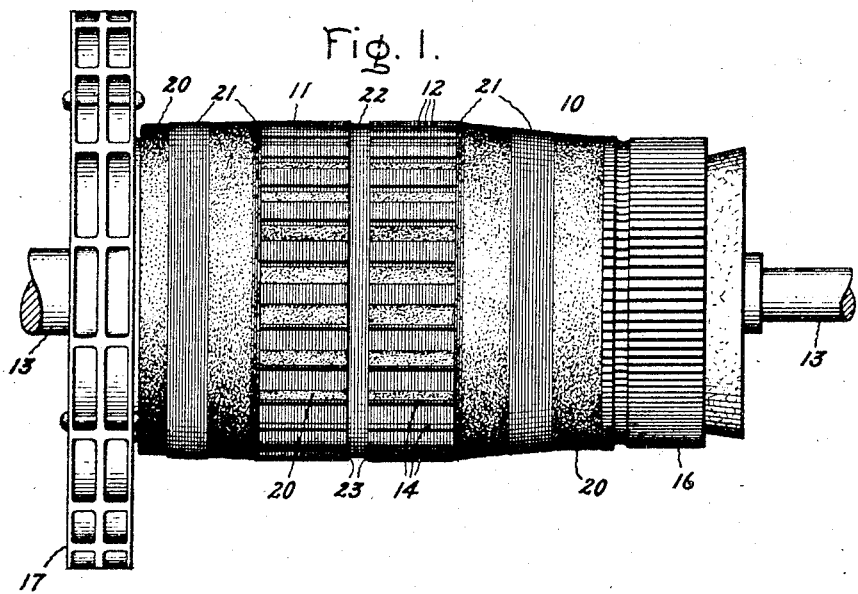

For a more complete understanding of my invention reference should be had to the accompanying drawing in which: Fig. 1 is an elevation of an assembled armature constructed in accordance with my invention, and Fig. 2 is an elevation of the armature showing the armature coils and leads during one stage of the armature assembly.

Referring to the drawing I have shown my invention in one form as applied to the windings of a direct current dynamo-electric machine armature. As shown, the armature 10 comprises an armature core 11 having a plurality of suitable metal laminations 12 mounted upon the armature shaft 13. The laminations 12 are provided with a plurality of spaced longitudinal recesses 14 in which the armature windings or coils 15 may be suitably received. A suitable commutator 16 is mounted upon one end of the shaft 13 in spaced relation with the core 11, and a suitable cooling fan 17 is mounted upon the other end of the shaft 13 in spaced relation with the core 11. Thus two spaces 18 are formed by the spaced arrangement of the core 11, the commutator 16 and the fan 17, one space being defined by the core and the commutator and the other being defined by the core and the fan.

Figure 2:
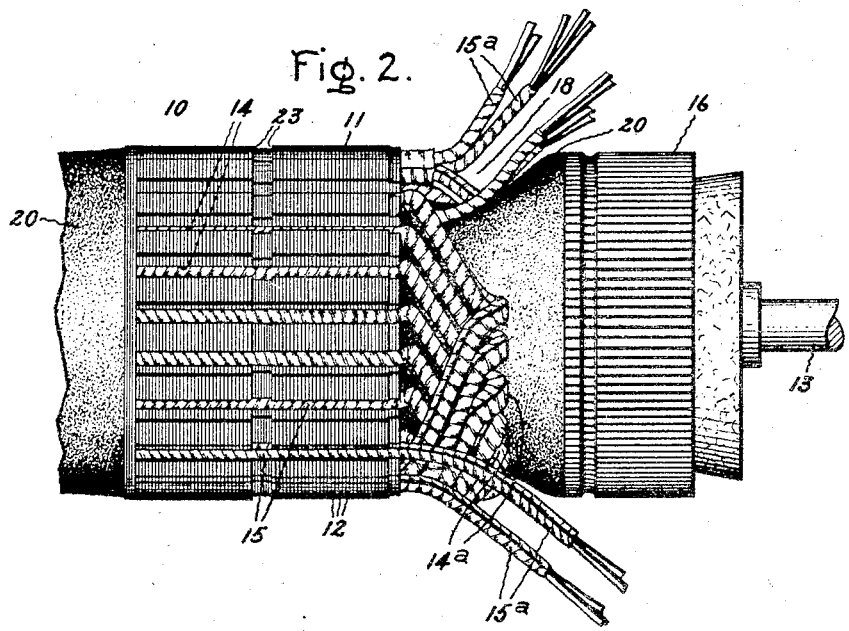

Referring to Fig. 2, it will be observed that the completed armature coils 15 are placed within the recesses 14 and that their end turns $14^a$ project beyond both ends of the core 11 into the spaces 18. It will also be observed that the commutator leads $15^a$ project beyond the commutator end of the core 11 and extend to the commutator to which they may be secured by any suitable means well known in the art. Although any suitable armature windings or coils 15 may be employed, I prefer to use coils preformed from conductors insulated and treated in accordance with the method described and claimed in my Patent No. 1,531,259, dated March 24, 1925.

It will be understood that during the operation of the armature, excessive vibration of the coils and commutator leads may occur, particularly where the armature is operated at high speeds and where there is any appreciable amount of stray magnetism. Consequently if the armature coils and leads are not rigidly held in position, the excessive vibration causes breakage of the armature leads which results in armature failure. It will also be understood that it is often necessary to operate small motors, for instance those used in railway service, at high temperatures and that efficient cooling means must be provided for the coils or else the insulating materials will fail.

In order to overcome these difficulties I provide an insulating and binding material in the form of a plastic putty. This putty is preferably of a hydro-carbon composition comprising a suitable cementing and insulating varnish mixed with proper proportions of a suitable filling mineral powder. I have found that a mixture comprising approximately 60% cementing and insulating asphaltum varnish and approximately 40% powdered soapstone gives very satisfactory results Preferably the asphaltum varnish should comprise a large percentage of asphalt dissolved in a suitable hydrocarbon solvent. It will be understood that the asphaltum of the mixture performs the function not only of suitably binding the mixture but also of insulating the coils, and it will be further understood that the soapstone performs both the functions of insulating the coils, and of conducting heat therefrom whereby the heat in the armature conductors will be equalized and diffused and a large radiating surface for the coils will be afforded.

In constructing the armature in accordance with my invention, the plastic mineral compound or putty 20 will be progressively applied, as the coils are laid in the recesses 14. For instance, a small amount of the putty will be placed in the armature recesses, an armature coil 15 will be placed upon this layer of putty, then a layer of putty will be placed upon the armature coil upon which another armature coil may be placed if desired. The spaces 18 will also be provided with layers of putty 20 upon which the end turns 14ª and commutator leads will be placed. Then the insulating and binding putty 20 will be thoroughly packed in and around all of the end turns 14ª and around all of the commutator leads 15ª of the armature coils so that all air pockets will be eliminated, after which the upper portions of the recesses 14 above the armature coils will be completely filled with the putty so that all of coils will be completely imbedded and surrounded with the binding and insulating mixture 20. It will be understood that the mixture 20 completely fills the spaces 18 (Fig. 1), the core 11, the commutator 16 and the fan 17 comprising end supporting walls for the mixture.

After the armature 10 has been so constructed and packed, the whole is subjected to a baking process by which the plastic compound is rapidly heated to a temperature of about 125° C. at which temperature the volatile constituents are driven off. Preferably the putty is heated by passing an electric current through the coils 15 so that the volatiles will be forced outwardly from the interior portions of the putty. After the putty has been allowed to cool it will be hardened to such a degree that it will hold the coils and commutator leads rigidly in place. In order to further enhance the strength and rigidity of the finished armature, the portions of the putty covering the end turns may be wound with binding wires 21. A similar winding 22 may also be wound about the putty which covers those portions of the coils 15 that are placed within the recesses 14, a suitable circumferential recess 23 being provided in the laminations 12 for receiving the winding 22.

It is to be noted that the putty not only performs the function of securely holding the coils and leads in place but also fills all dead air spaces and spaces between the coils and, therefore, so diffuses and equalizes the heat in the armature conductors that much larger heat radiating surfaces are provided than in the case of the ordinary windings so that the windings operate at a much lower temperature than the ordinary armatures in present operation. It is to be further noted that the plastic nature of the putty permits expansion of the armature conductors without the formation of air holes and pockets. As a result the finished armature presents an absolutely continuous surface whereby the entrance of oil, dirt, water, air, etc. is prevented.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention the scope of which is set forth in the annexed claims.

What I claim as new and desire to secure by Letters Patent of the United States, is:

1. The method of securing the windings of an electrical device which consists in packing said windings with an insulating, heat conducing, plastic compound, said compound being progressively applied during the assembly of the windings.

2. The method of securing the conductor coils and leads of an electrical device which consists in imbedding said conductors and leads in a plastic compound comprising approximately 60% asphaltum and 40% soapstone, said compound being progressively applied during the assembly of the coils and leads, and then heating said plastic compound to drive off the volatile constituents.

3. The method of making an armature which consists in providing a core having a plurality of longitudinally extending openings, providing a plurality of electrical conductors within said openings, packing an insulating, heat resisting, plastic asphaltum putty in intimate contact with said coils, heating said putty to a temperature high enough to drive off the volatile constituents, and then cooling said putty so that said putty is hardened whereby the coils are securely bound together and held in place.

4. The method of making an armature which consists in providing a core having a plurality of longitudinally extending openings to receive conductor coils, providing a commutator, providing a plurality of conductor coils within said openings and extending the leads of said coils to said commutator, and imbedding said coils and commutator leads in an insulating, heat conducting and plastic asphaltum putty said putty being progressively applied during assembly of said coils and leads.

5. The method of making an armature which consists in providing a core having a plurality of longitudinally extending recesses, providing a commutator, providing a plurality of conductor coils within said recesses and extending their leads to said commutator, providing a putty comprising approximately 60% asphaltum and 40% soapstone, packing said putty about said coils and leads in intimate contact therewith, heating said putty to a temperature of approximately 125° C., and then after cooling, winding portions of the exterior surface of said putty.

6. A rotatable armature for electric machines comprising a core having longitudinal recesses, a plurality of conductor coils disposed in said recesses and having their end turns projecting beyond the ends thereof, and an insulating, heat conducting, plastic putty comprising approximately 60% asphaltum and approximately 40% soapstone packed into intimate contact with said coils within said recesses and in and about said end turns.

7. A rotatable armature for electric machines comprising a core having longitudinal recesses, a commutator, a plurality of conductor loops mounted within said recesses and having leads extending to said commutator, and a putty comprising approximately 60% asphaltum and approximately 40% soapstone packed in intimate contact with said coils and leads.

8. A rotatable armature for electric machines comprising a core having a plurality of longitudinally extending recesses, a commutator, a plurality of conductor loops superimposed within said recesses having their end turns projecting beyond said recesses and having leads extending to said commutator, and an insulating, heat conducting, plastic putty comprising approximately 60% asphaltum and approximately 40% soapstone packed in intimate contact about said coils within said recesses, in and about said end turns and about said commutator leads.

In witness whereof, I have hereunto set my hand this 21st day of May, 1928.

HARRY W. TURNER.